US 9,588,874 B2

(12) United States Patent
Aasheim et al.

(10) Patent No.: US 9,588,874 B2
(45) Date of Patent: Mar. 7, 2017

(54) REMOTE DEVICE AUTOMATION USING A DEVICE SERVICES BRIDGE

(71) Applicant: MICROSOFT TECHNOLOGY LICENSING, LLC, Redmond, WA (US)

(72) Inventors: Jered Aasheim, Bellevue, WA (US); Aaron Clarke, Redmond, WA (US); Ryan Pangrle, Seattle, WA (US); David Owens, Redmond, WA (US); Jesse Wesson, Vancouver (CA); Robert Daly, Redmond, WA (US); Nicolas Trescases, Bellevue, WA (US); Jay Daniels, New York, NY (US); Joe LeBlanc, Redmond, WA (US); Colin Arenz, Everett, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 56 days.

(21) Appl. No.: 13/715,924

(22) Filed: Dec. 14, 2012

(65) Prior Publication Data
US 2014/0173355 A1 Jun. 19, 2014

(51) Int. Cl.
G06F 11/36 (2006.01)
G06F 13/38 (2006.01)

(52) U.S. Cl.
CPC ........ *G06F 11/3664* (2013.01); *G06F 13/385* (2013.01); *G06F 2213/3808* (2013.01)

(58) Field of Classification Search
CPC ............... G06F 11/3664; G06F 13/385; G06F 2213/3808
See application file for complete search history.

(56) References Cited

U.S. PATENT DOCUMENTS 5,617,347 A * 4/1997 Lauritzen ............ G06F 12/0884
365/189.07
7,441,254 B1 * 10/2008 Holland .............. G06F 9/44521
707/999.104

(Continued)

OTHER PUBLICATIONS

Balan, et al., "Tactics-Based Remote Execution for Mobile Computing", In Proceedings of the 1st International Conference on Mobile Systems, Applications and Services, May 5, 2003, 14 pages.

(Continued)

*Primary Examiner* — Philip Chea
*Assistant Examiner* — Wuji Chen
(74) *Attorney, Agent, or Firm* — Dave Ream; Tom Wong; Micky Minhas

(57) ABSTRACT

Pairing information is used by the target application to determine how to connect to the correct controller. A network pipe is established between the target application and the controller. The network pipe is used to pass information, such as to deliver/receive test information, between the controller and target application. A bridge may also be established between the controller and an analysis tool for the device hosting the target application. The bridge creates a communication path for the controller to send/receive information (e.g. commands, queries) to the analysis tool s to perform tests of the target application. Code may also be injected into the target application such that dynamic linked libraries may be simulated. Crash data may also be obtained by the controller (or some other device) that may not be typically available by a particular device platform.

20 Claims, 11 Drawing Sheets

(56) References Cited

U.S. PATENT DOCUMENTS

| | | | |
|---|---|---|---|
| 7,684,347 B2* | 3/2010 | Merkey | H04L 43/02 370/252 |
| 7,949,004 B2* | 5/2011 | Diab | H04L 12/2805 370/419 |
| 2001/0054110 A1* | 12/2001 | Kikinis | H04L 12/5692 709/239 |
| 2001/0056416 A1* | 12/2001 | Garcia-Luna-Aceves | G06F 12/1483 |
| 2002/0162053 A1* | 10/2002 | Os | G06F 11/366 714/38.13 |
| 2004/0064575 A1* | 4/2004 | Rasheed | H04L 67/322 709/232 |
| 2004/0205406 A1* | 10/2004 | Kaliappan et al. | 714/31 |
| 2004/0215503 A1* | 10/2004 | Allpress | G06Q 10/06311 705/7.39 |
| 2004/0226031 A1* | 11/2004 | Zimmerman | G06F 9/44521 719/331 |
| 2006/0070053 A1* | 3/2006 | Andersen | G06F 8/54 717/163 |
| 2006/0106729 A1 | 5/2006 | Roberts, Jr. | |
| 2006/0143668 A1* | 6/2006 | Du Breuil | H04N 7/17318 725/89 |
| 2007/0179854 A1* | 8/2007 | Ziv | G06F 21/10 705/14.25 |
| 2008/0025229 A1* | 1/2008 | Beliles | H04L 63/1433 370/245 |
| 2008/0134039 A1* | 6/2008 | Fischer | G06F 17/30053 715/733 |
| 2008/0304472 A1* | 12/2008 | Gourlay | H04L 45/02 370/352 |
| 2008/0320222 A1* | 12/2008 | Dhodapkar | G06F 12/121 711/118 |
| 2009/0013310 A1 | 1/2009 | Arner et al. | |
| 2009/0070436 A1* | 3/2009 | Dawes | G06Q 30/02 709/219 |
| 2009/0138109 A1* | 5/2009 | Park | G06F 17/30772 700/94 |
| 2009/0158140 A1* | 6/2009 | Bauchot | G06Q 30/02 715/234 |
| 2009/0257345 A1* | 10/2009 | King | H04L 41/22 370/216 |
| 2009/0320099 A1* | 12/2009 | Rao | H04L 9/3236 726/3 |
| 2010/0180050 A1 | 7/2010 | Hsiao et al. | |
| 2012/0173928 A1* | 7/2012 | Bohrer | G06F 11/3648 714/28 |
| 2012/0180029 A1 | 7/2012 | Hill et al. | |
| 2012/0233612 A1 | 9/2012 | Beckett | |
| 2013/0010600 A1* | 1/2013 | Jocha | H04L 43/026 370/236.2 |
| 2013/0091582 A1* | 4/2013 | Chen | G06Q 10/10 726/26 |
| 2013/0103911 A1* | 4/2013 | Bulut | G06F 12/0866 711/144 |
| 2013/0205415 A1* | 8/2013 | McKee | G06F 21/00 726/30 |
| 2014/0153441 A1* | 6/2014 | Frey | H04L 43/50 370/255 |
| 2014/0207912 A1* | 7/2014 | Thibeault | H04L 67/2847 709/219 |

OTHER PUBLICATIONS

Wargo, John M., "PhoneGap Development, Testing, and Debugging", Published on: Jul. 10, 2012, Available at: http://www.informit.com/articles/article.aspx?p=1915792&seqNum=5.

Zheng, et al., "Spotlight—The Rise of the Smart Phone", In Proceedings of IEEE—Distributed Systems Online, vol. 7, Issue 3, Mar. 2006, 14 pages.

Storey, David, "Remote Debugging with Opera Dragonfly", Published on: Jul. 17, 2008, Available at: http://dev.opera.com/articles/view/remote-debugging-with-opera-dragonfly/.

Blasing, et al., "An Android Application Sandbox System for Suspicious Software Detection" In Proceedings of 5th International Conference on of Malicious and Unwanted Software (MALWARE), Oct. 19, 2010, 8 pages.

Zhang, et al., "A Mobile Agent-Based Tool Supporting Web Services Testing", In Journal of Wireless Personal Communications, vol. 56, Issue 1, Jan. 2010, 26 pages.

International Search Report and Written Opinion for PCT/US2013/074775 mailed Apr. 22, 2014.

* cited by examiner

| | ID | Friendly Name | IP | Controller |
|---|---|---|---|---|
| Edit | 1 | Name 1 | 192.168.216.1 | xxx-123.local |
| Edit | 2 | Name 2 | 192.168.26.1 | xxx-123.local |
| Edit | 3 | Name 3 | 192.158.26.1 | yzz-123.local |
| Edit | 4 | Name 4 | 192.168.46.1 | xxx-123.local |
| Edit | 5 | Name 5 | 192.168.216.2 | xxx-123.local |
| Edit | 6 | Name 6 | 192.168.216.3 | xxx-331.local |

310

| | ID | Friendly Name | IP | Controller |
|---|---|---|---|---|
| Edit | 1 | Name 1 | 192.168.216.1 | xxx-123.local |
| Edit | 2 | Name 2 | 192.168.26.1 | xxx-123.local |
| Edit | 3 | Name 3 | 192.158.26.1 | yzz-123.local |
| Edit | 4 | Name 4 | 192.168.46.1 | xxx-123.local |
| Edit | 5 | Name 5 | 192.168.216.2 | xxx-123.local |
| Edit | 6 | Name 6 | 192.168.216.3 | xxx-331.local ♦ |
| 321 | | 322 | 324 | 326 |

REMOTE DEVICE AUTOMATION USING A DEVICE SERVICES BRIDGE

BACKGROUND

Computing devices, ranging from specialized devices to phones to tablets, continue to rapidly evolve and are increasingly capable of supporting complex software stacks. For example, the smartphone of today is as capable as a personal computer from a just few years ago. This improvement in processing power creates the opportunity to deliver the same applications, services, and productivity experiences on these new form factors as is available on traditional desktop computing devices. These devices, however, do not currently have the same development, debugging, and verification tools available on the desktop computer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One or more pairings are created between a target application (e.g. an application running in a restricted/sandboxed environment on a mobile device) and a controller. For example, a target application may have different pairings with different test controllers. The pairing information is used by the target application to determine how to connect to the correct controller. A network pipe is established between the target application and the controller. The network pipe is used to pass information, such as to deliver/receive test information, between the controller and target application. A bridge may also be established between the controller and an analysis tool for the device hosting the target application. The analysis tool may be used by the controller to perform some tasks that are accomplished using the analysis tool that are not available to outside processes. For example, some devices utilize a proprietary analysis tool that is used to perform tasks such as: changing a display orientations, profiling a CPU, simulate memory warnings, perform input/touch gestures, and the like. The analysis tool may also provide verification information that may not be available to outside processes. The bridge creates a communication path for the controller to send/receive information (e.g. commands, queries) to the analysis tool s to perform tests of the target application. Code may also be injected into the target application such that dynamic linked libraries may be simulated. Crash data may also be obtained by the controller (or some other device) that may not be typically available by a particular device platform.

BRIEF DESCRIPTION OF THE DRAWINGS

FIG. 3 illustrates an exemplary web interface for editing test controller and target application pairings;

DETAILED DESCRIPTION

Figure 1:
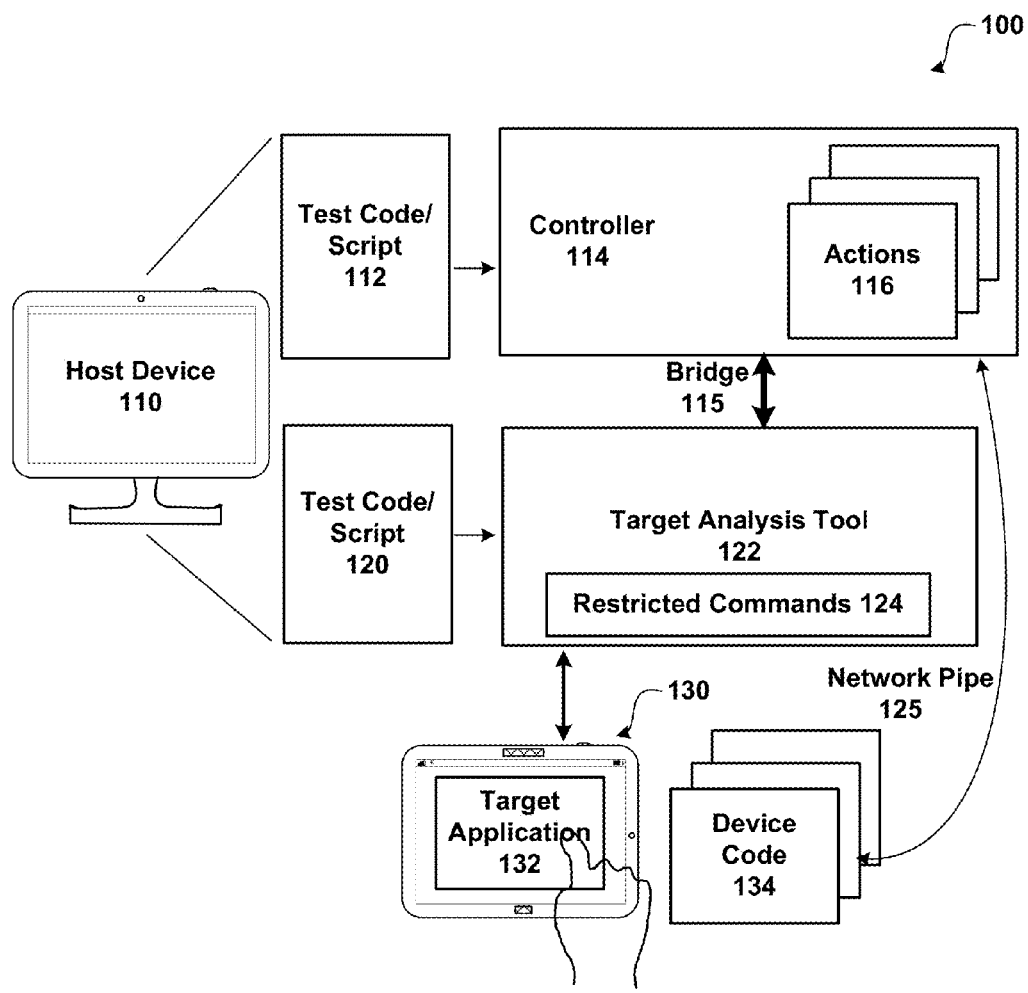
FIG. 1 shows a system for remote device automation.

Referring now to the drawings, in which like numerals represent like elements, various embodiment will be described.

FIG. 1 shows a system for remote device automation. As illustrated, system 100 includes host device 110 comprising test code/script 112, controller 114 coupled to target analysis tool 122 using bridge 115, test code/script 120, and target device 130 coupled to controller 114 through network pipe 125.

System 100 as illustrated comprises a touch screen input device/display 130 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micromachined accelerometers, piezoelectric devices, capacitive sensors, resistive sensors, inductive sensors, laser vibrometers, and LED vibrometers.

One or more pairings are created between target application 132 (e.g. an application running in a restricted/sandboxed environment on a computing device) and a controller. For example, a target application may have different pairings with different test controllers including automated/non-automated test controllers (See FIG. 2 and related discussion). The pairing information is used by the target application to determine how to connect to the correct controller.

Network pipe 125 is established between the target application 132 and controller 114. The network pipe is used to pass information, such as to deliver/receive test information, between controller 114 and target application 132. A bridge 115 is established between the controller and an analysis tool 122 for the device hosting the target application. The analysis tool may be used by the controller to perform some tasks that are accomplished using the analysis tool that are not available to outside processes. For example, some devices utilize a proprietary analysis tool (e.g. APPLE INSTRUMENTS) that is used to perform tasks such as: changing a display orientations, profiling a CPU, simulate memory warnings, perform input/touch gestures, and the like. The analysis tool may also provide verification information that may not be available to outside processes. The bridge creates a communication path for the controller to send/receive information (e.g. commands, queries) to the analysis tool s to perform tests of the target application. Code may also be injected into the target application such that dynamic linked libraries may be simulated. Crash data may also be obtained by the controller (or some other device) that may not be typically available by a particular device platform.

Many computing devices use sandboxed application environments (e.g. APPLE iOS) that restricts execution of various functionality or commands 124 that may be available on other computing devices. Further, these sandboxed application environments may restrict testing to a proprietary analysis tool (e.g. APPLE INSTRUMENTS). The present invention attempts to overcome some of a platforms restrictions to allow for more automated and richer testing environments. For example, a typical test automation system (e.g. non-sandboxed) may use a scheduler that implements a test harness to execute tests in an independent process to communicates via interprocess communications with the product software. This type of "out-of-proc" testing, however, may not be possible in sandboxed environments since the test code does not interact with the product code using shared resources (i.e. shared memory, file I/O, mailboxes, etc.).

Network pipe 125 uses the target device's 130 network connection to communicate with the controller (e.g. controller 114) to enable out-of-proc or in-proc software testing of product software.

Some platforms mandate that some tasks be accomplished using the device platform's proprietary tool chain. For example, the APPLE INSTRUMENTS analysis tool is presently the only supported way to perform tasks such as: making the device change the display orientation (i.e. portrait to landscape), profiling CPU, battery life, network usage, simulate memory warnings, and the like. Communication with these proprietary analysis tools can be difficult (e.g. they don't provide scripting or programming interfaces). Bridge 115 is established between controller 114 and analysis tool 122 such that command/information may be passed between tool and controller.

According to an embodiment, information (e.g. messages) sent over the bridge/pipe follow a protocol. The protocol is directed at managing messages and specifying the application data. The following is a discussion of a possible protocol that may be used to communicate information over the bridge 115 and/or network pipe 125. Generally, a byte count and a protocol ID is prepended to the message content for a message that generally follows the form:

According to an embodiment, information (e.g. messages) sent over the bridge/pipe follow a protocol. The protocol is directed at managing messages and specifying the application data. The following is a discussion of a possible protocol that may be used to communicate information over the bridge 115 and/or network pipe 125. Generally, a byte count and a protocol ID is prepended to the message content for a message that generally follows the form:

```
SMA Protocol
{
  Int32 ProtocolID;
  Int32 ByteCount;
  ByteArray message
}
```

A pipe subclass waits for the data to be received and then creates and dispatches a conforming Message object.

Subclasses of the Message class are used to generate message content. According to an embodiment, the data of the message is arbitrary and opaque to the components. Serialization and deserialization may be selected depending on the implementation. According to an embodiment, the Message class may be implemented as a pure virtual base class or an interface. In Objective-C, Message may be implemented as a protocol:

A pipe subclass waits for the data to be received and then creates and dispatches a conforming Message object.

```
@protocol SmaMessage <NSObject>
-(NSData*)data;
-(id)initWithData:(NSData*)data;
@end
```

In general terms a provided object constructor takes a data stream and a data member that retrieves the data stream. The specific details of building an object from application data and retrieving application data from an existing object are left to the implementation of the conforming class.

Network pipe 125 uses the target device's 130 network connection to communicate with the controller (e.g. controller 114) to enable out-of-proc or in-proc software testing of product software.

The transport of data is facilitated by subclasses of the Pipe class. According to an embodiment, the base class Pipe class doesn't provide transport functionality on its own. The pipe provides callback functionality that passes incoming messages to clients which is used by subclasses. For example, in the Objective-C implementation, it does this by way of the addSelector:toTarget:forProtocol selector allowing clients to specify the object and selector that should be notified when a message is received for a given protocol.

Apart from the dispatch of incoming messages, other pipe functionality is specific to the transport implementation and may be implemented by subclasses with knowledge of the actual transport.

Because of the opaque relationship between Pipe and Message, it may not be readily ascertainable for a pipe to determine what kind of object is to be created for any given incoming message. In the objective-c implementation, the mapping between incoming protocols and their associated classes is provided by the MessageFactories singleton. As a client, the setFactory:forProtocol: method allows a client to specify which class factory you want to use for a given protocol.

Figure 2:
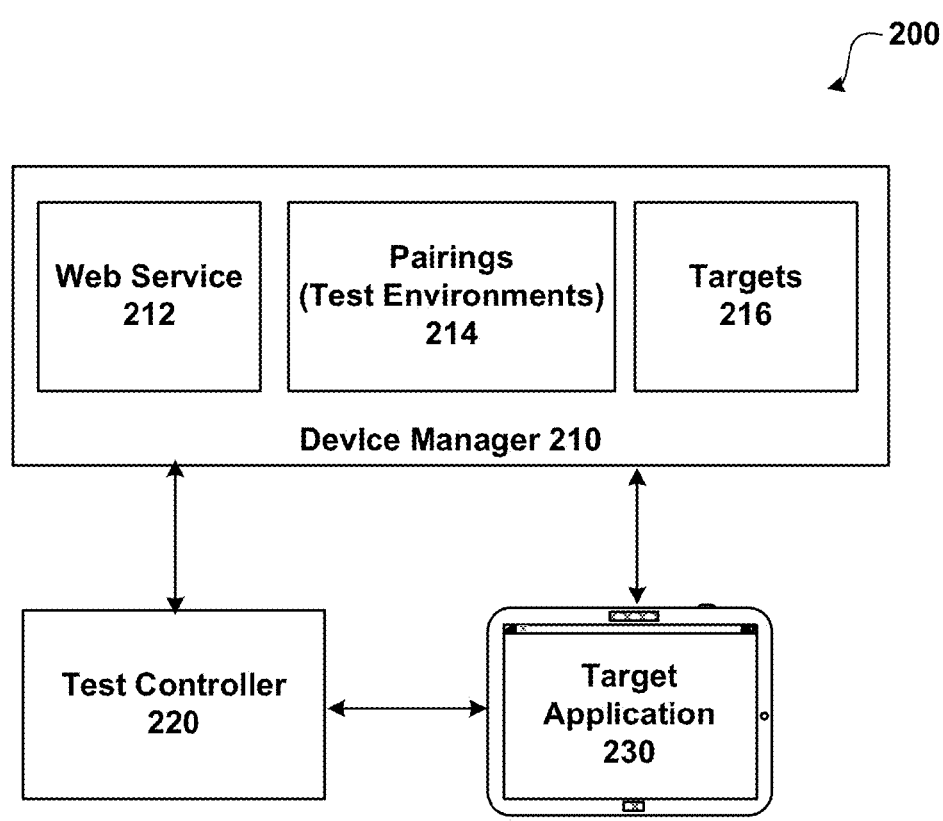
FIG. 2 shows connecting a target application with a test controller.

FIG. 2 shows connecting a target application with a test controller. As illustrated, system 200 includes device manager 210, test controller 114 and target application 230.

The Device Manager (DM) 210 manages the relationships and initial communication between different network endpoints, such as a test controller and a target application. The Device Manager 210 as illustrated shows a web service 212, a pairings storage 214 and a list of targets 216.

The device manager manages the connection information used by the target application to connect to the test controller. Instead of storing an address to a specific test controller that may change over time, the device manager maintains a central location that may be modified with the most recent connection information.

After target application 230 connects to 210 initially, target application 230 is directed to the appropriate test controller. DM 210 maintains a table of targets 216.

Test controller 220 establishes a connection with DM 210 and sends a message to test controller 220 with its device information. DM 210 accepts the connection from the test controller and uses the device information info along with the IP address (which it knows from the established connection) to determine which test controller has connected.

Target application 230 establishes a connection with DM 210 and sends a message to test controller 220 with device information used to identify the target application. DM 210 accepts the connection from the target application and uses the device information to determine which test controller to which to direct the target application.

Target application 230 then uses the connection information to directly establish a connection with the test controller 220.

FIG. 3 illustrates an exemplary web interface for editing test controller and target application pairings. As illustrated, FIG. 3 includes display 310 and display 320.

Display 310 shows a web interface that shows different pairings (e.g. IDs 1-6). The web interface provides a way to edit a target record. According to an embodiment, each new target that connects to the DM has an entry created.

Display 320 shows editing of different fields of record. For example, click Edit to change the FriendlyName or Controller pairing.

Clicking the edit button 321 allows a user to change the friendly name, the IP address, and the controller assigned to the target. According to an embodiment, the friendly name for the target is stored in the DM. The control user interface element 326 lists the different controllers available. A user may select the desired controller from the list of the different controllers.

Figure 4:
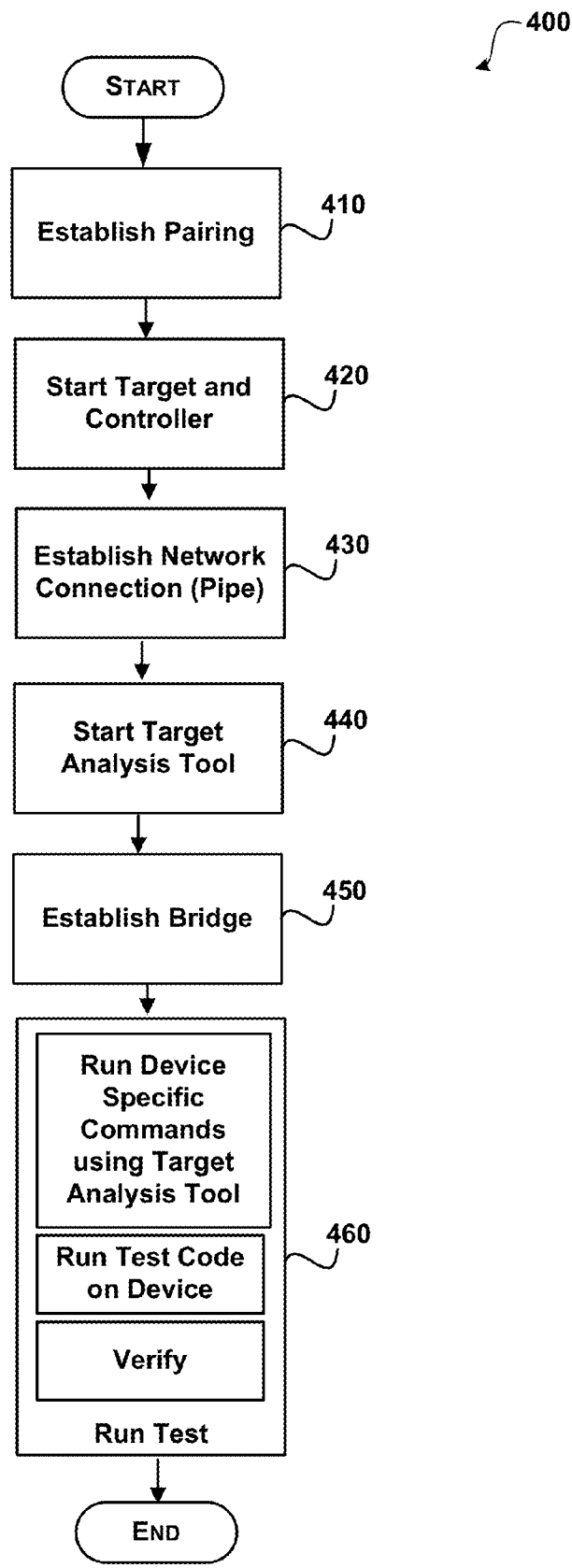
FIG. 4 shows process for remote device automation.
Figure 5:
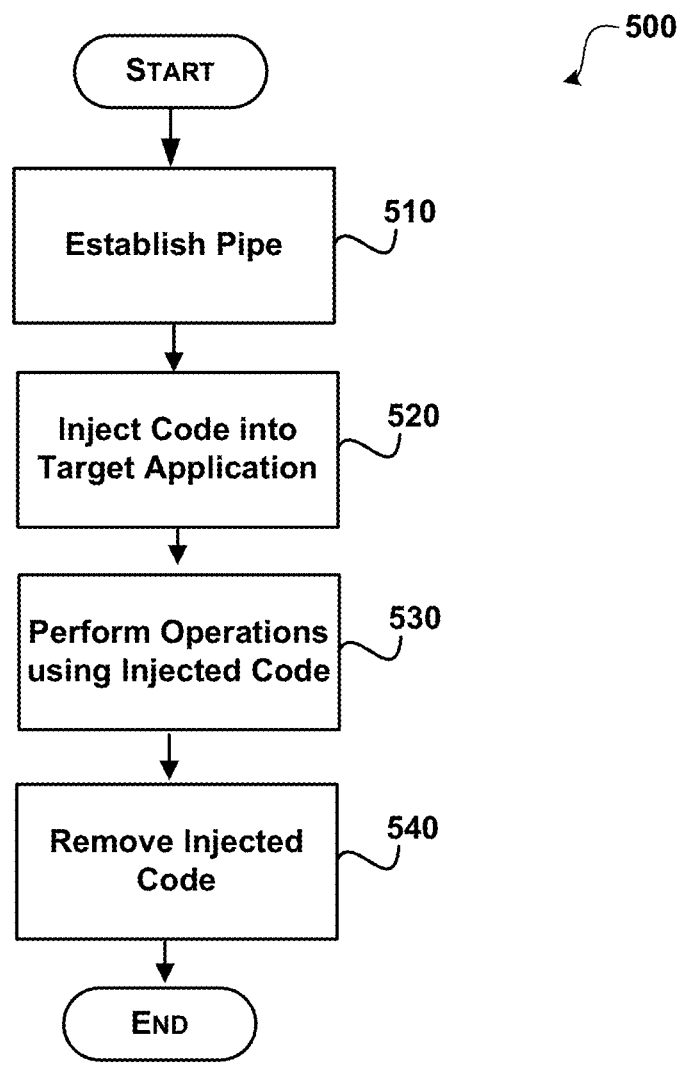
FIG. 5 shows a process for simulating dynamic linking within a target application.
Figure 6:
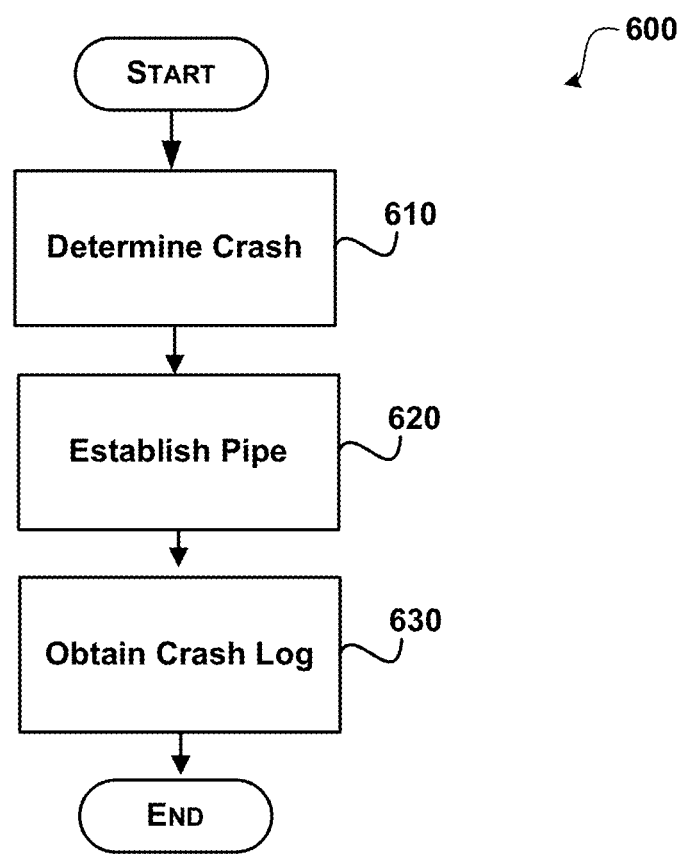
FIG. 6 illustrates obtaining crash data from a target application running on a closed/sandboxed application.

FIGS. 4-6 show illustrative processes for communicating with a target application using a network pipe. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 4 shows process for remote device automation.

After a start operation, the process moves to operation 410, where a pairing is established between a controller and a target. According to an embodiment, the controller is a test controller configured to perform tests on a target application. According to another embodiment, the controller is any application that communicates with a target application.

Flowing to operation 420, the target application and controller are started. According to an embodiment, the controller starts first and registers with a device manager. When the target application is launched, the target sends a request to the domain manager to determine the pairing with a controller. The controller may change depending on the scenario. For example, in one test, a first controller may be used, in a second test, a different controller may be used and the like.

Moving to operation 430, a network connection (pipe) is established between the target and controller. According to an embodiment, the target does not know the controller to connect with until after sending a message to the device manager. Once the target is provided with an address of the controller, the target and controller establish a network connection.

Transitioning to operation 440, the target analysis tool is started. Generally, the target analysis tool is an analysis tool that is specific to a type of operating system/device the target application is on. For example, INSTRUMENTS from APPLE CORPORATION, JUNIT for ANDROID devices, and the like. In some situations (e.g. touch/input events, . . . ), the target analysis tool is needed to run certain commands on a computing device due to the closed/sandboxed environment many applications on these devices operate. For example, the analysis tool may be needed to generate a touch event (i.e. select, drag, . . . ) on the device to simulate testing. In addition to performing certain events, the analysis tool may provide different analysis information as compared to the analysis information that is available outside of the analysis tool. Using the system as described herein is directed at leveraging existing tools, testability frameworks, and automation systems such that software vendors developing applications for these closed applications may more fully test and analyze the complex software stacks integrated on to these devices.

Flowing to operation 450, a bridge is established between the controller and the analysis tool. The bridge is established such that communication may occur between the controller and the analysis tool. For example, the test controller may send a message to the analysis tool requesting an operation to be performed and/or obtain information (e.g. state) from the device.

Moving to operation 460, the test is run on the target device using the test controller and the target analysis tool. Many commands may be performed without the use of the analysis tool may be performed by providing the target application with the device code through the network pipe and/or sending a message to the target application through the network pipe to execute code. When a restricted command is to be executed on the device including the target application, the test controller sends a message to the target analysis tool to request the operation. Similarly, the test controller may send an inquiry to the analysis tool requesting a state on the target device. According to an embodiment, code may injected/deleted during runtime within the target application that is to be performed (e.g. simulate dynamic linking) even though a target device may not allow dynamic linking and/or changing code during runtime. The injected code may be provided through the network pipe. The bridge and network pipe may also be used to perform verification of states/conditions of a target application that are not always available when using just the target analysis tool. For example, some analysis tools may not be able to verify if an object is properly displayed within an application.

The process then moves to an end operation and returns to processing other actions.

FIG. 5 shows a process for simulating dynamic linking within a target application.

While most personal computers the ability to dynamically link and load software libraries to allow applications and services to late bind against software modules, many platforms today do not support dynamic linking in the sandboxed application environment. DLLs are useful for many different reasons (decreases storage footprint of applications via shared components, allows for dynamic runtime behavior based on versions of library, facilitates $3^{rd}$ party plugin ability, etc.). The lack of support for dynamic linking can restrict test execution scenarios. For example, during execution of a test, it may be useful to make a runtime decision as to which test libraries need to be loaded in order to complete the desired scenarios. As mentioned, some platforms (e.g. APPLE iOS) require the static linking of all of the test libraries/bundles into the target application code and do not authorize/allow the use of DLLs. This static linking requirement can create a host of maintenance and runtime problems (e.g. test code size balloons unnecessarily, install times increase, etc.). These devices already have constrained resources (e.g. RAM) so this limitation can materially impact the ability to use existing test frameworks and methodologies as discussed herein.

According to an embodiment, code is injected into the target application during runtime, thereby simulating dynamic linked libraries (DLLs). The code injection is directed at allowing the use of existing software designs and testing strategies reliant on dynamic linking despite the natural restrictions of the device platform.

After a start operation, the process flows to operation 510 where a network pipe is established between the controller and the target application.

Flowing to operation 520, the injected code is delivered to the target application using the established network pipe. The injected code is used in place of the use of dynamic-link libraries (DLLs) that may be restricted from being used in the closed/sandboxed environment the target application executes. Instead of creating an application (e.g. a test application) that includes all of the possible test scenarios, code is injected/removed from the target application while it is executing. The injected coded is directed at providing a way to modularize target applications so that their functionality can be updated and reused more easily. The injected code may also help reduce memory overhead for a target application.

Moving to operation 540, the injected code is removed from the target application when determined. For example, the injected code may be removed after the target application has performed a test that is defined by the injected code.

The process then flows to an end operation and returns to processing other actions.

FIG. 6 illustrates obtaining crash data from a target application running on a closed/sandboxed application.

Moving to operation 610 a determination is made as to when a crash occurred. The determination may be made using different methods. For example, the target application may determine when a crash occurs and/or the target device may examined (e.g. checking for the existence of a crash log on the device). For example, the abort handlers inside a target applications may be configured to trap software exceptions and generate a crash log on the device. According to an embodiment, the crash log is separate from the crash log generated by the restricted environment.

Flowing to operation 620, a network pipe is established that is used to transmit the crash log.

Transitioning to operation 630, the crash log is then returned back to an automated system (e.g. during testing) or an error reporting system when it happens in the field. These crash logs may be aggregated and then resymbolicated against the original software builds to provide us rich telemetry information on the history of software crashes across the target applications on these devices. Applications that execute on some computing devices may provide a limited way to access crash data. For example, crash log data may only be accessible through a website. Additionally, this crash data may not provide full crash data related to an application. For example, crash logs for a limited number of crashes that occurred within a rolling window of time may be available. Providing limited crash data is less than ideal and doesn't allow full inspection into historical crash defect and quality issues across the deployment cycle of our software.

Figure 7:
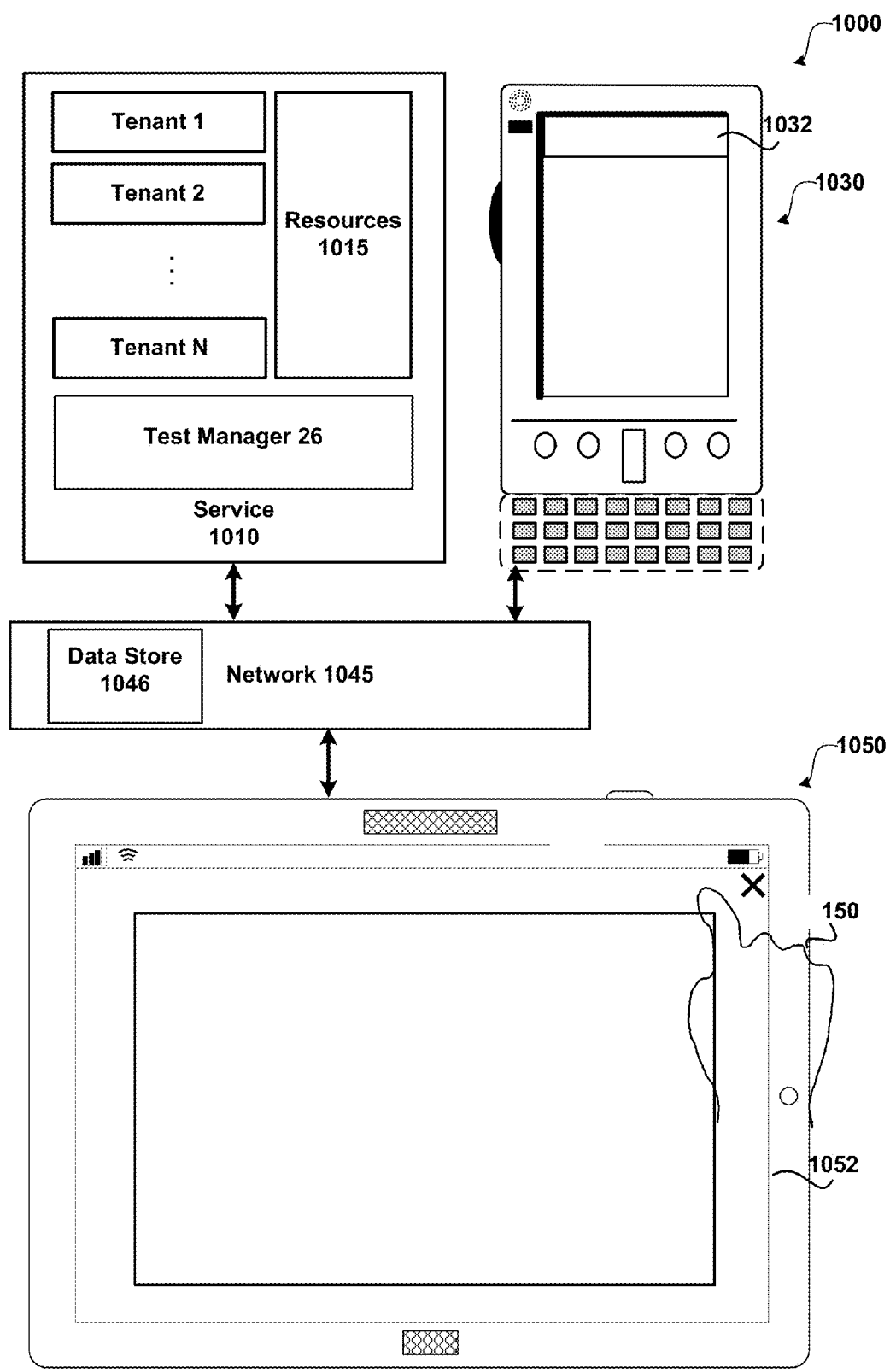
FIG. 7 illustrates an exemplary system for remote device automation.

FIG. 7 illustrates an exemplary system for remote device automation. As illustrated, system 1000 includes service 1010, data store 1045, touch screen input device/display 1050 (e.g. a slate) and smart phone 1030.

As illustrated, service 1010 is a cloud based and/or enterprise based service that may be configured to provide services, such as productivity services (e.g. MICROSOFT SKYDRIVE, LYNC or some other cloud based/online service that is used to interact with content (e.g. spreadsheets, documents, presentations, charts, messages, and the like). The service may be interacted with using different types of input/output. For example, a user may use touch input, hardware based input, speech input, and the like. The service may provide speech output that combines pre-recorded speech and synthesized speech. Functionality of one or more of the services/applications provided by service 1010 may also be configured as a client/server based application. Although system 1000 shows a service relating to a productivity application, other services/applications may be configured.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030 and touch screen input device/display 1050 are configured with productivity applications.

As illustrated, touch screen input device/display 1050 and smart phone 1030 shows exemplary displays 1052/1032 showing the use of an application. Data may be stored on a device (e.g. smart phone 1030, slate 1050 and/or at some other location (e.g. network data store 1045). The applications used by the devices may be client based applications, server based applications, cloud based applications and/or some combination.

Test manager 26 is configured to perform operations relating to remote device automation as described herein. While manager 26 is shown within service 1010, the functionality of the manager may be included in other locations (e.g. on smart phone 1030 and/or slate device 1050 and/or service 1010).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
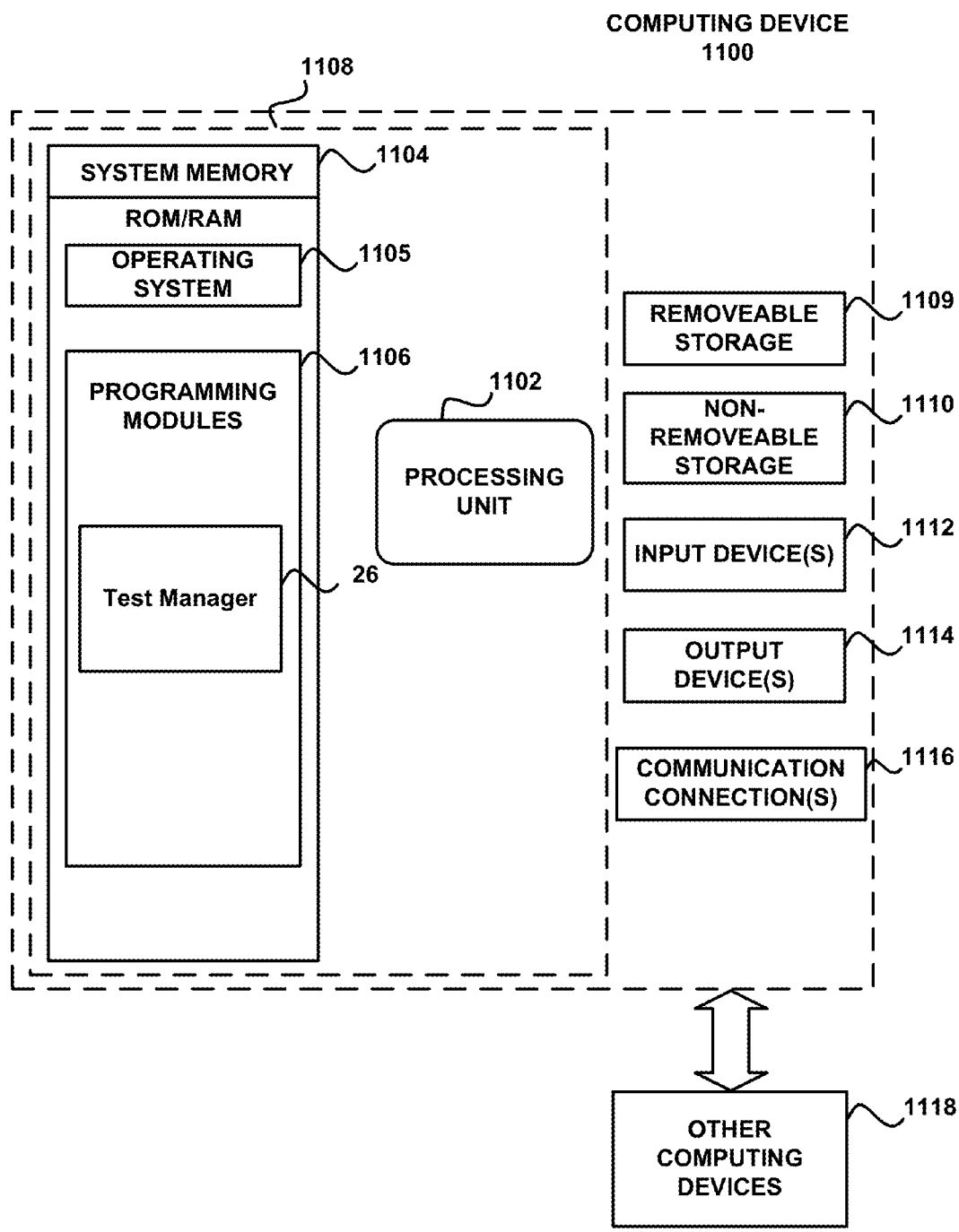
FIGS. 8-10 and the associated descriptions provide a discussion of a variety of operating environments in which embodiments of the invention may be practiced.
Figure 9A:
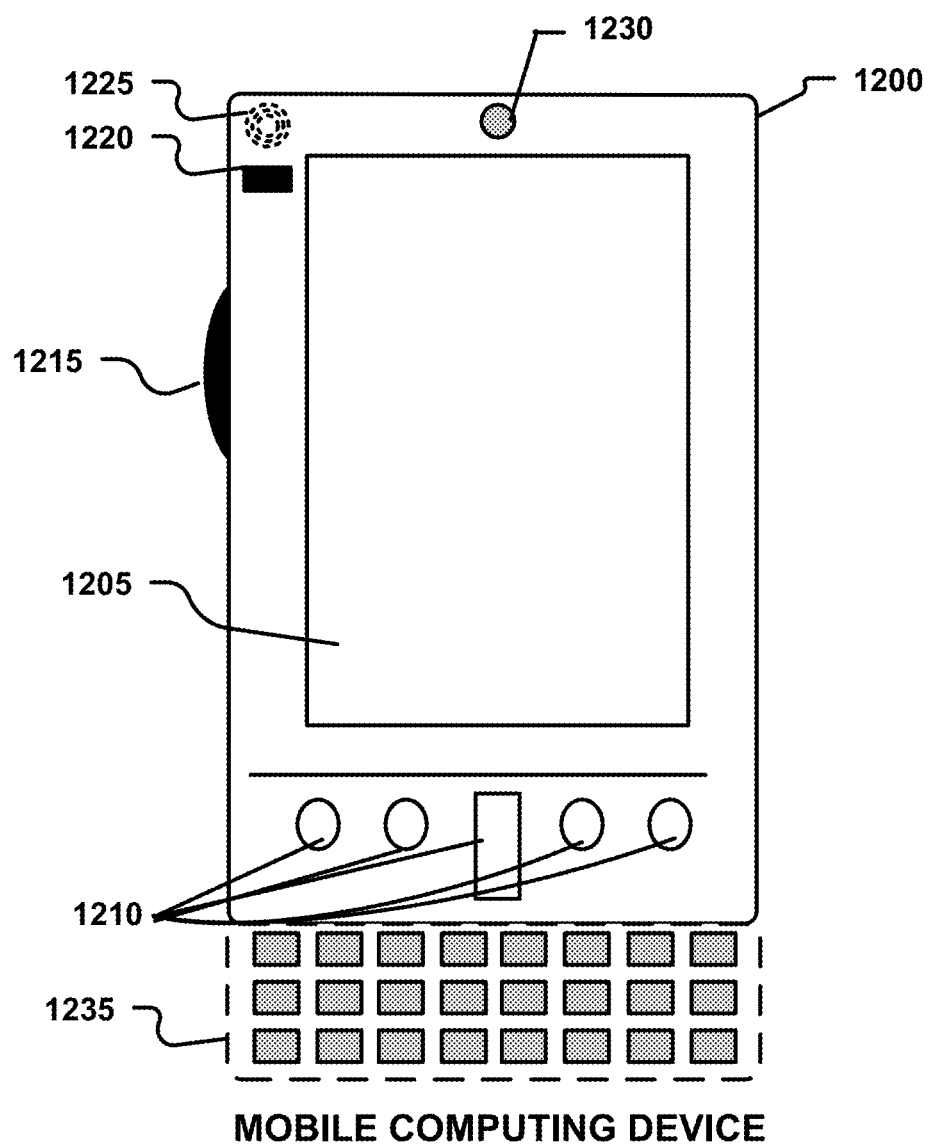
Figure 9B:
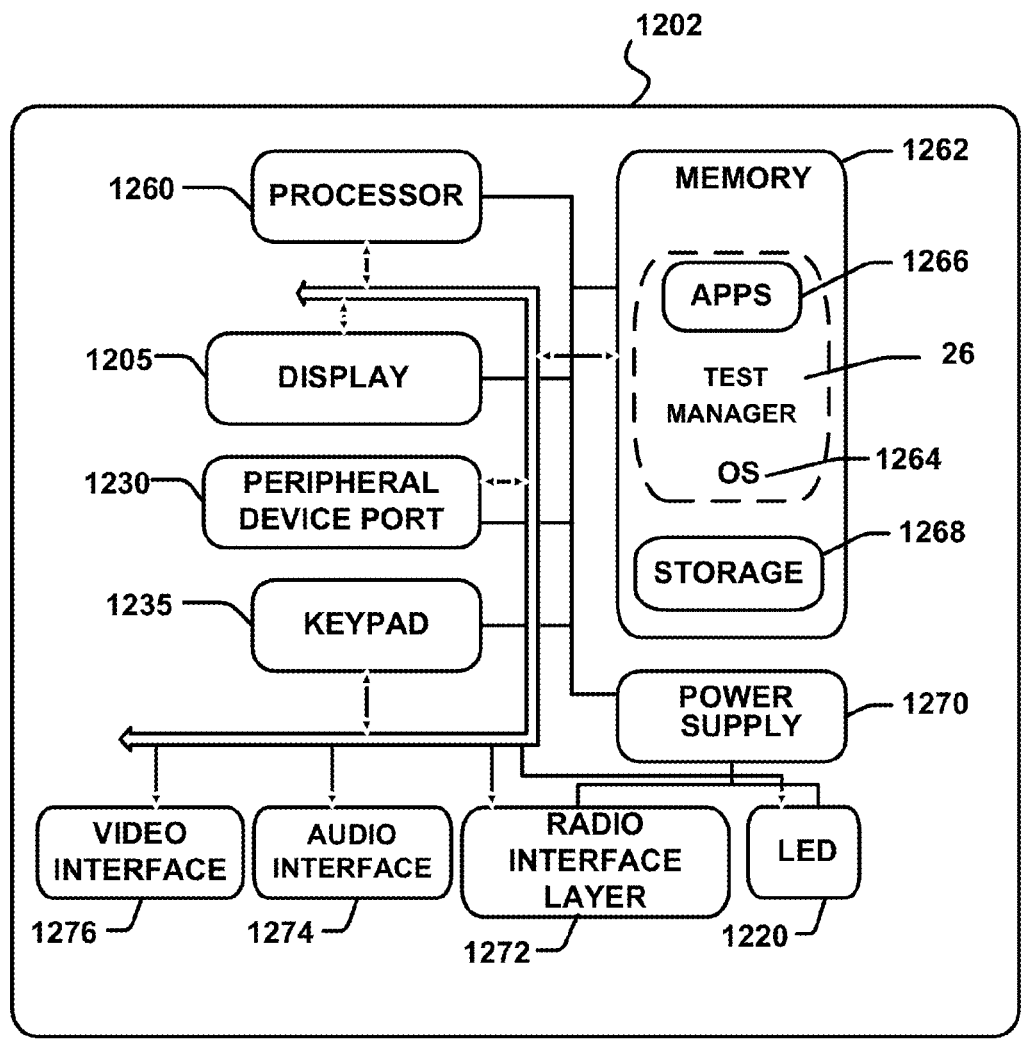
Figure 10:
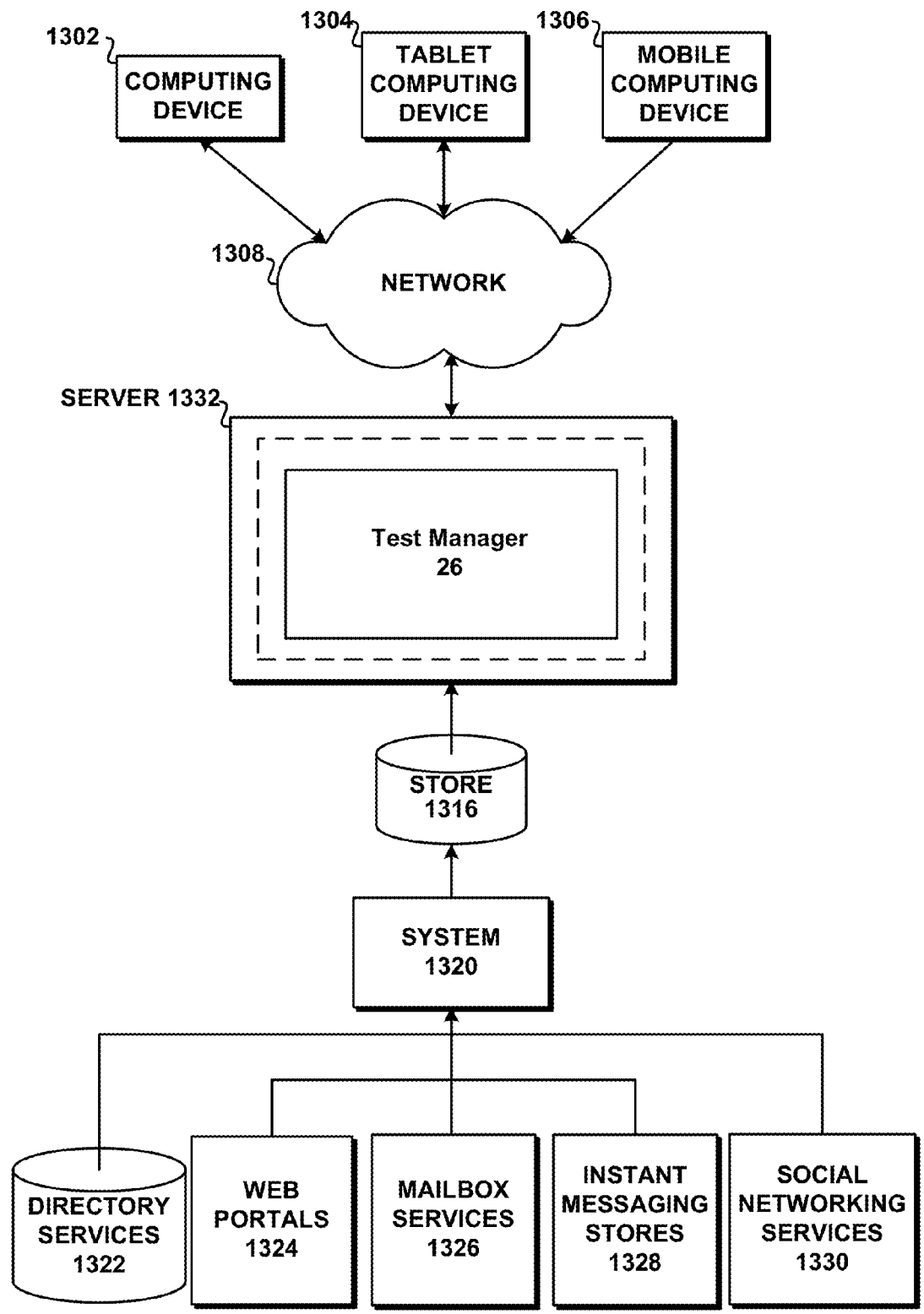

FIGS. 8-10 and the associated descriptions provide a discussion of a variety of operating environments in which embodiments of the invention may be practiced. However, the devices and systems illustrated and discussed with respect to FIGS. 8-10 are for purposes of example and illustration and are not limiting of a vast number of computing device configurations that may be utilized for practicing embodiments of the invention, described herein.

FIG. 8 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a test manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 8 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data.

System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a suitable mobile computing environment, for example, a mobile telephone, a smart-phone, a tablet personal computer, a laptop computer, and the like, with which embodiments of the invention may be practiced. With reference to FIG. 9A, an example mobile computing device 1200 for implementing the embodiments is illustrated. In a basic configuration, mobile computing device 1200 is a handheld computer having both input elements and output elements. Input elements may include touch screen display 1205 and input buttons 1215 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1215. Mobile computing device 1200 may also include an optional keypad 1235. Optional keypad 1215 may be a physical keypad or a "soft" keypad generated on the touch screen display.

Mobile computing device 1200 incorporates output elements, such as display 1205, which can display a graphical user interface (GUI). Other output elements include speaker 1225 and LED light 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 9B is a block diagram illustrating components of a mobile computing device used in one embodiment, such as the computing device shown in FIG. 9A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application programs 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the test manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application programs 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone 1220 to receive audible input, such as to facilitate a telephone conversation. In accordance with embodiments of the present invention, the microphone 1220 may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 12B by storage 1268. Computer storage media may include volatile and non-volatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 10 illustrates a system architecture for remote device automation.

Components managed via the test manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to testing an application. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for communicating with an application through a network pipe, comprising:
   starting a target application on a first computing device having a first set of functionality defined by a first operating environment, wherein the first operating environment requires static linking to libraries and restricts use of dynamic linked libraries;
   determining a pairing between the target application and a controller executing on a second computing device having a second set of functionality defined by a second operating environment of the second computing device;
   establishing a network pipe between the controller and the target application used for sending and receiving messages between the controller and the target application;
   driving application behavior of the target application using the network pipe comprising accessing functionality on the second computing device that is not available in the first set of functionality; and
   simulating use of dynamic linked libraries by injecting code into the target application during runtime using the established network pipe.

2. The method of claim 1, further comprising establishing a bridge between the controller and an analysis tool.

3. The method of claim 2, wherein the analysis tool is used to perform a set of tasks on the first computing device that is unavailable to the controller.

4. The method of claim 1, further comprising injecting code into the target application during runtime such that a code size of the target application changes during the runtime.

5. The method of claim 1, further comprising providing crash log data in response to determining that a crash occurs in the target application.

6. The method of claim 5, wherein providing the crash log data comprises using the network pipe to obtain the crash log data.

7. The method of claim 1, wherein determining the pairing between the target application and the controller comprises accessing a device manager maintaining a pairing table that includes pairings between different target applications and different controllers.

8. The method of claim 7, wherein the pairing table is editable by a user.

9. The method of claim 1, further comprising the target application obtaining pairing information from a device manager that is used by the target application to establish the network pipe with the controller.

10. A computer-readable storage device storing computer-executable instructions for communicating with an application, comprising:
 starting a target application on a first computing device in a sandboxed environment, wherein the sandboxed environment requires static linking to libraries and restricts use of dynamic linked libraries;
 determining a pairing between the target application and a controller executing on a second computing device;
 establishing a network pipe between the controller and the target application used for sending and receiving messages between the controller and the target application;
 driving application behavior of the target application using the network pipe comprising accessing functionality on the second computing device that is not available in the sandboxed environment; and
 simulating use of dynamic linked libraries by injecting code into the target application during runtime using the established network pipe.

11. The computer-readable storage device of claim 10, further comprising establishing a bridge between the controller and an analysis tool that is used to perform a set of tasks on the first computing device that is unavailable to be performed by the controller.

12. The computer-readable storage device of claim 10, further comprising injecting code into the target application during runtime such that a code size of the target application changes during the runtime.

13. The computer-readable storage device of claim 10, further comprising providing crash log data in response to determining that a crash occurs in the target application.

14. The computer-readable storage device of claim 13, wherein providing the crash log data comprises using the network pipe to obtain the crash log data.

15. The computer-readable storage device of claim 10, wherein determining the pairing between the target application and the controller comprises a device manager maintaining a pairing table that includes pairings between different target applications and different controllers.

16. The computer-readable storage device of claim 10, further comprising the target application obtaining pairing information from a device manager that is used by the target application to establish the network pipe with the controller.

17. A system for communicating with an application, comprising:
 a display that is configured to receive touch input;
 a processor and memory;
 an operating environment executing on the processor;
 a test controller that is configured to test a target application in a sandboxed environment, wherein the sandboxed environment requires static linking to libraries and restricts use of dynamic linked libraries;
 receiving a request to establish a network pipe with the target application;
 establishing the network pipe between the controller and the target application used for sending and receiving messages between the controller and the target application;
 driving application behavior of the target application using the network pipe such that the target application is tested using functionality that is not available in the sandboxed environment; and
 simulating use of dynamic linked libraries by injecting code into the target application during runtime using the established network pipe.

18. The system of claim 17, further comprising establishing a bridge between the controller and an analysis tool that is used to perform a set of tasks on the first computing device that is unavailable to be performed by the controller.

19. The system of claim 17, further comprising injecting code into the target application during runtime such that a code size of the target application changes during the runtime.

20. The method of claim 1, wherein the code injected into the target application is associated with a third party plugin.

* * * * *